United States Patent [19]
Togano et al.

[11] Patent Number: 5,419,932
[45] Date of Patent: May 30, 1995

[54] LIQUID CRYSTAL DEVICE AND DISPLAY APPARATUS

[75] Inventors: Takeshi Togano, Yokohama; Takao Takiguchi, Tokyo; Hideaki Takao, Sagamihara; Yukio Hanyu, Atsugi; Masanobu Asaoka, Yokohama; Takashi Iwaki, Machida, all of Japan

[73] Assignee: Canon Kabushiki Kaisha, Tokyo, Japan

[21] Appl. No.: 185,164

[22] Filed: Jan. 24, 1994

Related U.S. Application Data

[63] Continuation of Ser. No. 831,958, Feb. 6, 1992, abandoned.

[30] Foreign Application Priority Data

Feb. 8, 1991 [JP] Japan ................................. 3-017633

[51] Int. Cl.⁶ ............................................. G02F 1/1337
[52] U.S. Cl. ........................................ 428/1; 359/75
[58] Field of Search ..................... 428/1; 359/75-78

[56] References Cited

U.S. PATENT DOCUMENTS 4,367,924 1/1983 Clark et al. .................... 350/334
4,561,726 12/1985 Goodby et al. ................ 350/341
4,735,492 4/1988 Sekine et al. ..................... 428/1
4,759,614 7/1988 Yokokura et al. .............. 359/75
4,802,743 2/1989 Takao et al. ................ 350/339 F
4,820,026 4/1989 Okada et al. ................. 350/341
5,046,822 9/1991 Matsuda et al. ................... 428/1

FOREIGN PATENT DOCUMENTS 0365855 5/1990 European Pat. Off. .
107216 8/1981 Japan .

Primary Examiner—Alexander S. Thomas
Attorney, Agent, or Firm—Fitzpatrick, Cella, Harper & Scinto

[57] ABSTRACT

A liquid crystal device is formed by applying an alignment film on at least one of a pair of substrates sandwiching a liquid crystal, preferably a chiral smectic liquid crystal. The alignment is formed by a dehydrocyclization product of a polyamide acid which in turn is a reaction product of naphthalenetetracarboxylic acid or its derivative with a diamine or its derivative. The liquid crystal device provides a high contrast display, particularly by multiplexing drive, which is free from after-image because of quick responsiveness.

10 Claims, 11 Drawing Sheets

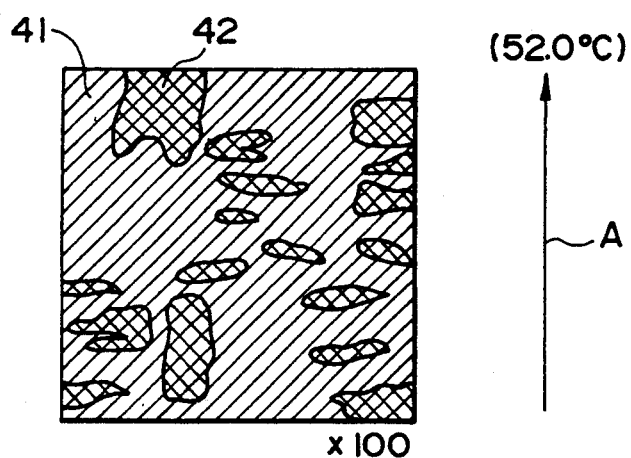
F I G. 4A
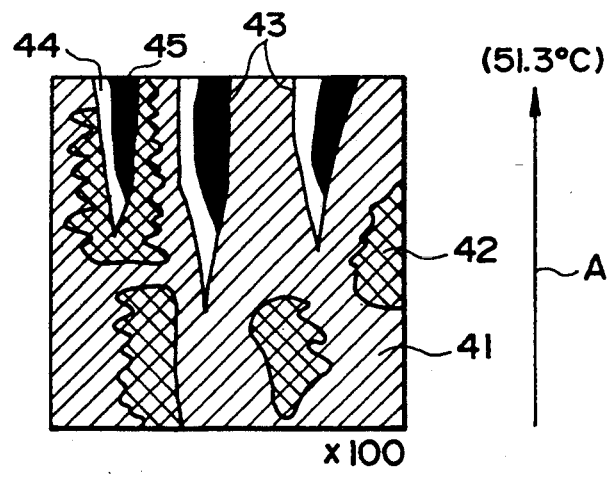
F I G. 4B
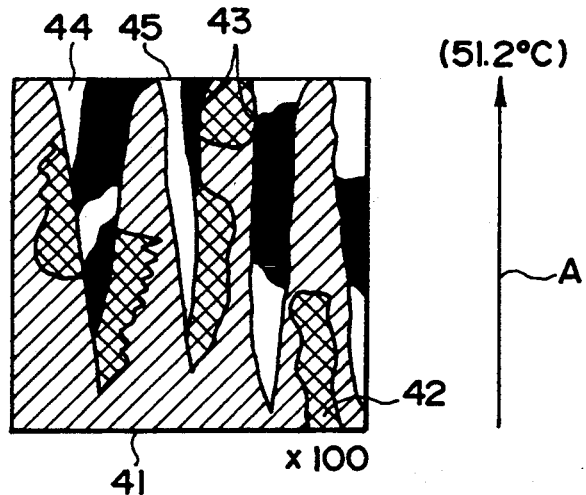
F I G. 4C

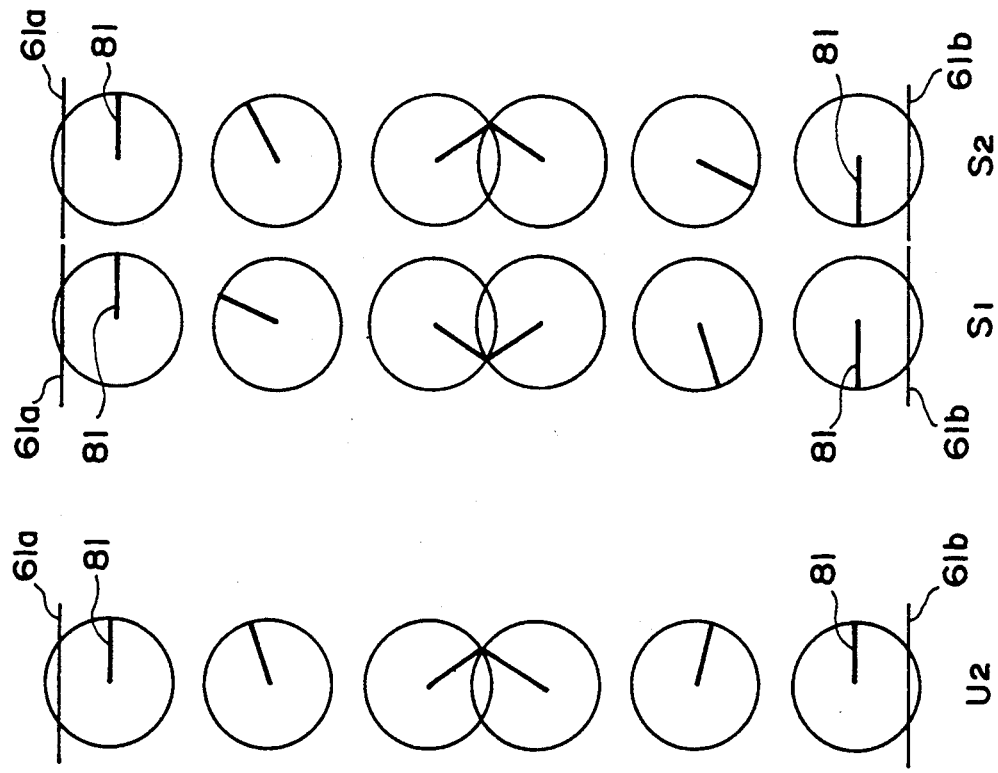
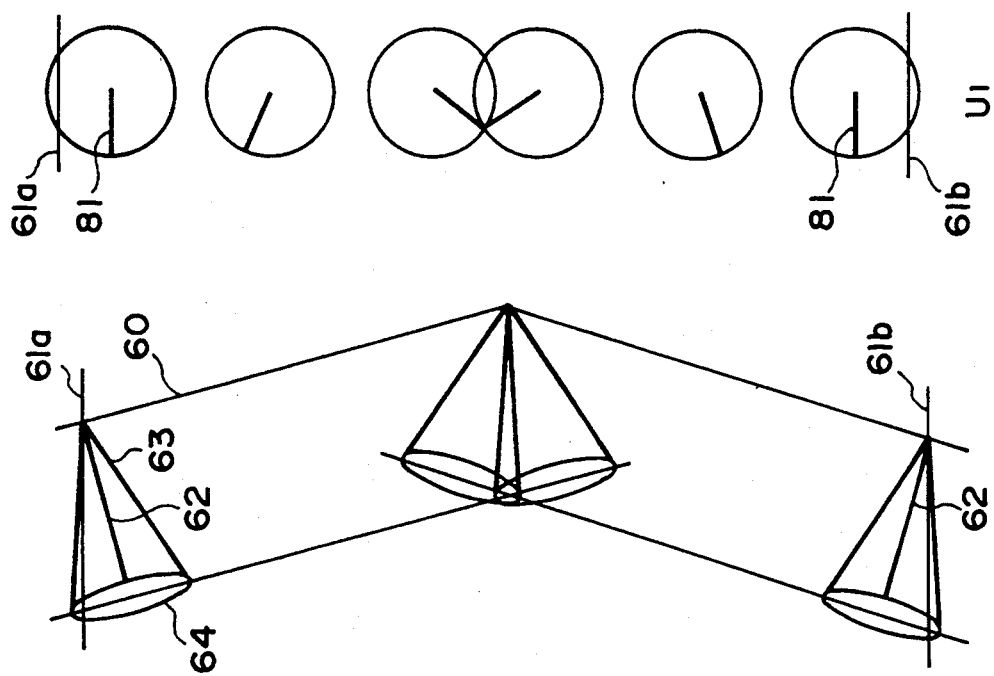
FIG. 6A  FIG. 6B  FIG. 6C

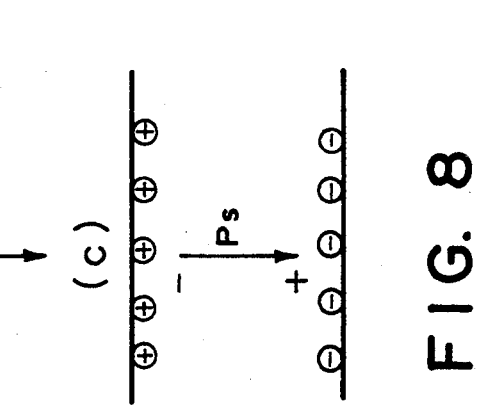
FIG. 8
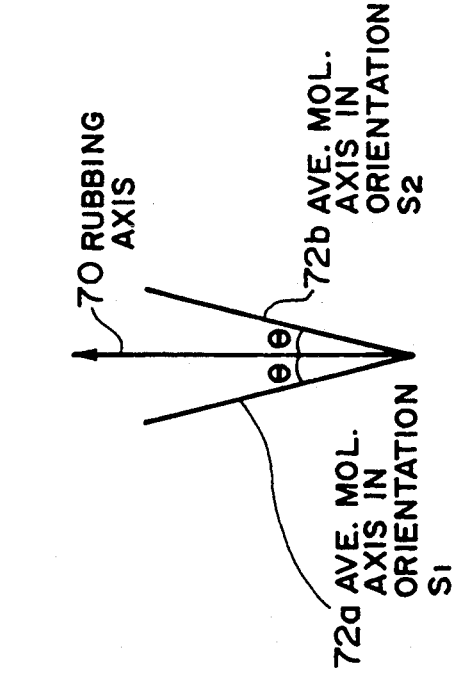
FIG. 9
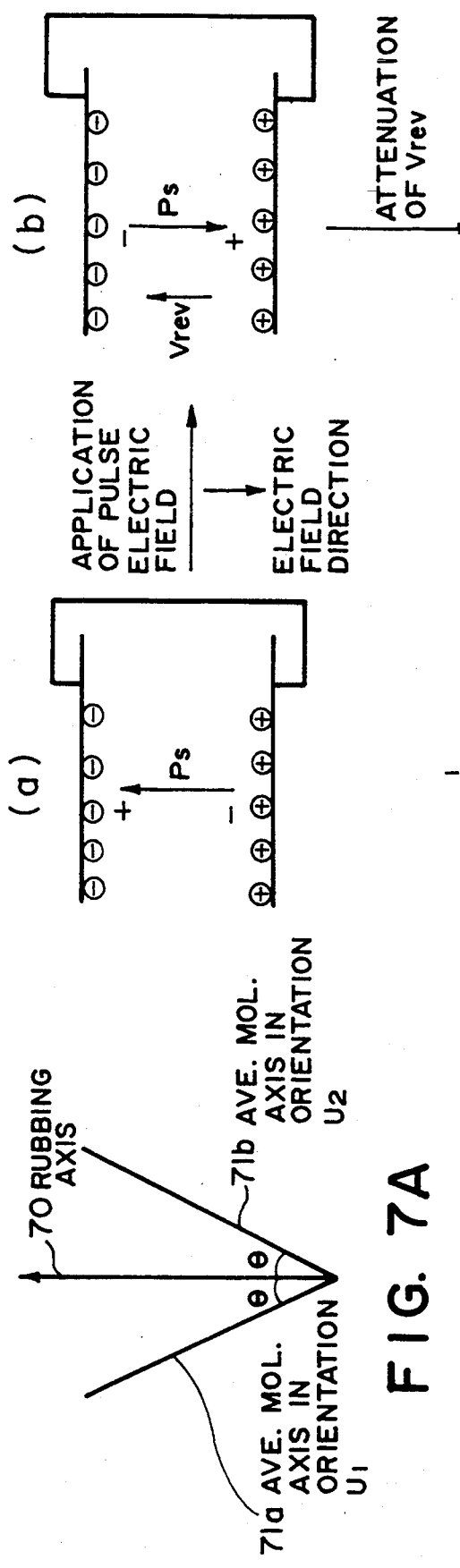
FIG. 7A
FIG. 7B

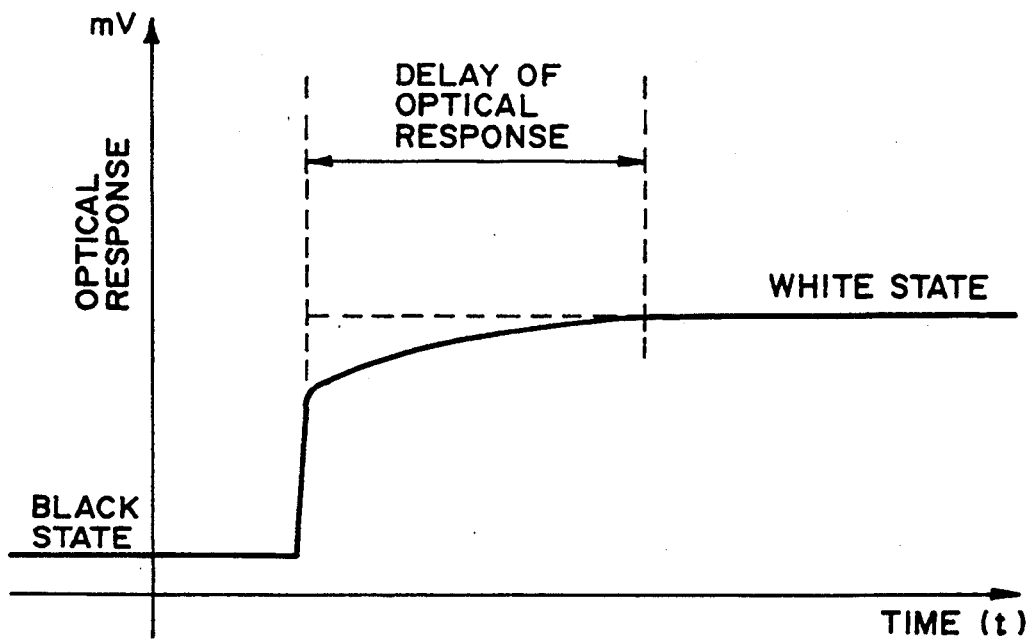
F I G. 10
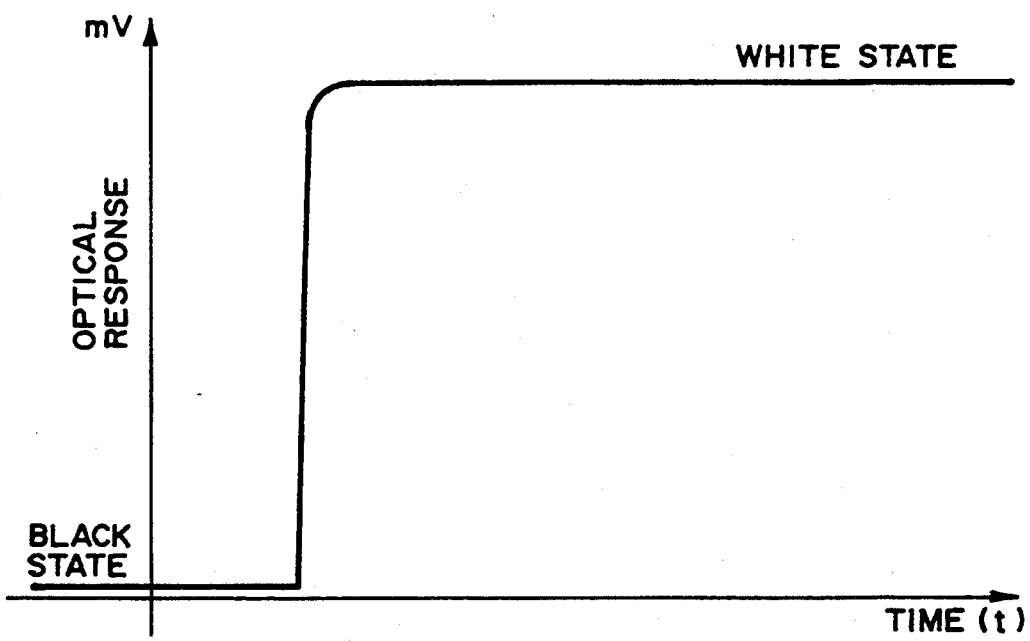
F I G. 11

LIQUID CRYSTAL DEVICE AND DISPLAY APPARATUS

This application is a continuation of application Ser. No. 07/831,958, filed Feb. 6, 1992, now abandoned.

FIELD OF THE INVENTION AND RELATED ART

This invention relates to a liquid crystal device to be used in a liquid crystal display device or a liquid crystal-optical shutter, etc., particularly a liquid crystal device by use of a ferroelectric liquid crystal, more particularly to a liquid crystal device improved in display characteristics through improvement in initial alignment of the liquid crystal molecules, and also a display apparatus using the liquid crystal device for a display panel.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107216/1981, U.S. Pat. No. 4,367,924). The ferroelectric liquid crystal has generally chiral smectic C phase (SmC*) of H phase (SmH*) of a non-helical structure and, in the SmC* or SmH*, phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

For an optical modulating device by use of a ferroelectric liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \cdot \sin^2 (\Delta nd/\lambda)\pi,$$

wherein
- $I_0$: incident light intensity,
- $I$: transmitted light intensity,
- $\theta$: tilt angle,
- $\Delta n$: refractive index anisotropy,
- $d$: thickness of the liquid crystal layer,
- $\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting bistability reported by Clark and Lagerwall, the following problems are encountered.

That is, according to our experiments, it has been found that a tile angle $\theta$ (an angle shown in FIG. 3 as described below) in a ferroelectric liquid crystal with a non-helical structure obtained by alignment with an alignment control film of the prior art has become smaller as compared with a tilt angle $(H)$ (the angle $(H)$ is a half of the apex angle of the cone shown in FIG. 2 as described below) in the ferroelectric liquid crystal having a helical structure. Particularly, the tilt angle $\theta$ in a ferroelectric liquid crystal with a non-helical structure obtained by alignment with alignment control films of the prior art was found to be generally on the order of 3-8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle $(H)$ in a helical structure. More specifically, it has been found that the tilt angle $\theta$ in a non-helical structure becomes smaller than the tilt angle $(H)$ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the tilt angle $\theta$ in the non-helical structure is smaller than the tilt angle $(H)$ in the helical structure.

Further, one of us has discovered the following phenomenon regarding the alignment state of a ferroelectric liquid crystal.

A pair of substrates are coated with rubbed alignment films of a polyimide, such as "LP-64" (trade name, available from Toray K.K.), providing a relatively low pre-tilt angle and applied to each other so that their rubbing directions are parallel with each other to form a blank cell having a cell gap of about 1.5 microns, which is then filled with a ferroelectric chiral smectic liquid crystal, such as "CS1014" (trade name, available from Chisso K.K.) to form a ferroelectric liquid crystal cell. When such a cell is gradually cooled from a higher temperature phase, the ferroelectric liquid crystal causes a series of state change as shown in FIGS. 4A-4E. More specifically, in a state shown in FIG. 4A formed immediately after transition from the higher temperature phase into SmC* phase, an alignment state (C1 alignment state) comprising micro-regions 41 and 42 showing a small contrast is developed. When the liquid crystal is further cooled to a certain temperature range, zigzag defects 43 are developed, and with such a defect as a boundary, micro-regions 44 and 45 providing a high-contrast alignment state (C2 alignment state) are developed as shown in FIG. 4B. On further temperature decrease, the C2 alignment state is enlarged (FIGS. 4C-4D) to finally occupy the entire region (FIG. 4E).

The two types of alignment states C1 and C2 may be explained by a difference in chevron structure of smectic layers as shown in FIG. 5. In FIG. 5, 51 denotes a smectic layer, 52 denotes a C1 alignment region, 53 denotes a C2 alignment region, and 56 denotes a liquid crystal molecule.

A smectic liquid crystal generally has a layer structure and, due to a shrinkage of spacing between layers when it causes a transition from SmA to SmC or SmC*, it assumes a chevron structure as shown in FIG. 5 where the layers are bent at a mid point between a pair of substrates. The bending assumes two directions corresponding to C1 and C2 as shown in FIG. 5. As is well known, liquid crystal molecules contacting a substrate surface form an angle (pre-tilt angle) due to rubbing, the direction of which is such that the liquid crystal molecules raise a forward end up (i.e., spaced from the substrate surface) in the direction of rubbing as shown in FIG. 5. Due to the presence of such a pre-tilt angle, the C1 and C2 alignment states are not equivalent regarding elastic energy, so that the above-mentioned transition is caused at a certain temperature. Such a transition can also caused by a mechanical distortion in some cases.

Hitherto, a liquid crystal device in the C2 alignment state has been provided in view of a high contrast. We have however discovered that a specific combination of an alignment film and a liquid crystal provides:

(1) that the above C1→C2 transition is not readily caused and, if the liquid crystal is appropriately selected, no C2 alignment is formed; and (2) that a pair of bistable states giving a high contrast is developed in addition to the known pair of bistable states giving a low contrast in the C1 alignment region.

Accordingly, a display of a higher quality is expected to be provided if the entire picture area of a display device is uniformly set in C1 alignment state, and the pair of bistable states giving a higher contrast is used for displaying two display states of white and black.

The above points (1) and (2) are discussed in further detail.

Regarding the point (1), the easiness of the C1→C2 transition depends on the pre-tilt angle $\alpha$ formed between a substrate and liquid crystal molecules adjacent to the substrate surface, the inclination angle $\delta$ of molecular layers and the tilt angle H of the liquid crystal as shown in Table 1 below.

TABLE 1

| | Liquid crystal | | |
|---|---|---|---|
| | a | b | c |
| | | tilt angle Ⓗ | |

TABLE 1-continued

| Alignment film | pretilt angle $\alpha$ | 12 deg. | 16 deg. | 22 deg. |
| | | layer inclination angle $\delta$ | | |
| | | 9.0 deg. | 12.5 deg. | 16.5 deg. |
|---|---|---|---|---|
| A | 2.5 deg. | C2 | C2 | C2 |
| B | 6 deg. | C1 | C1 | C1/C2 mixture |
| C | 12 deg. | C1 | C1 | C1 |

Table 1 shows that the C1 or C2 alignment state or a mixture thereof was formed in cases where three types of cells using three polyimide alignment films A–C having different pre-tilt angles were filled with three liquid crystals a–c showing different tilt angles. More specifically, the polyimide alignment film A was prepared from "LP-64" (trade name, Toray K.K.), the polyimide alignment film B was prepared from "SE-610" (trade name, Nissan Kagaku K.K.), and the polyimide alignment film C was prepared from a polyamide acid represented by the formula shown below, respectively by heat-curing. The alignment films A, B and C showed pre-tilt angles of 2.5 degrees, 6 degrees and 12 degrees, respectively.

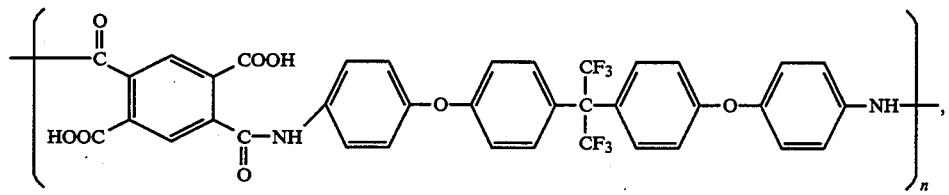

wherein n is a polymerization degree of 2–50 calculated based on measured data obtained by GPC (gel permeation chromatography).

Table 1 shows that a combination of a large pre-tilt angle and a small tilt angle allows the C1 alignment state to be maintained.

Regarding the point (2), when a conventional low pre-tilt alignment film is used, only a pair of bistable states providing a relatively low contrast can be stably present in the C1 alignment. In case of a high pre-tilt alignment film such as the alignment film C shown in Table 1, 4 states (2 pairs of states) are present in the C1 alignment, of which two states are the same as the conventional two states providing a low contrast liquid crystal directions are twisted between a pair of substrates and provide a blue color without providing an extinction position under observation through a polarizing microscope, hereinafter called a "splay state"), and the other two states provide a remarkably higher contrast and a larger apparent tilt angle (providing an extinction position under observation through a polarizing microscope, hereinafter referred to as a "uniform state"). The newly found uniform state has been found to provide a contrast and a transmittance which are higher than those attained in the C2 alignment.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display. The generation of the above-mentioned reverse electric field has been reported in "Switching characteristic of SSFLC" by Akio Yoshida, "Preprint for Liquid Crystal Forum, October 1987" p.p. 142-143.

SUMMARY OF THE INVENTION

Accordingly, an object of the present invention is to provide a ferroelectric liquid crystal device having solved the above-mentioned problems, particularly a ferroelectric liquid crystal device which provides a large tilt angle of a chiral smectic liquid crystal in a non-helical structure and provides a display capable of displaying a high-contrast image and yet free from after-image.

Another object of the present invention is to provide a display apparatus using such a liquid crystal device for display.

According to a principal aspect of the present invention, there is provided a liquid crystal device, comprising: a pair of substrates and a liquid crystal disposed between the substrates; at least one of said pair of substrates having thereon an alignment film comprising a polyimide formed by dehydrocyclization of a polyamide acid which is a reaction product of a tetracarboxylic acid component selected from naphthalenetetracarboxylic acid and derivatives thereof with a diamine component selected from diamine and derivatives thereof.

According to another aspect of the present invention, there is provided a display apparatus comprising the above-mentioned liquid crystal device as a display panel; drive means for supplying signal voltages to the electrodes of the liquid crystal device; and control means for controlling the drive means.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4A-4E are sketches of polarizing microscopic views of a liquid crystal cell showing a series of changes in alignment state when an injected ferroelectric liquid crystal is gradually cooled from a higher temperature phase.

FIG. 6A is a schematic sectional view showing an alignment state of a chiral smectic liquid crystal aligned according to the present invention; FIG. 6B is an illustration of C-director alignments in a uniform alignment state; and FIG. 6C is an illustration of C-director alignments in a splay alignment state.

FIGS. 7A and 7B are plan views illustrating tilt angles $\theta$ in a uniform alignment state and a splay alignment state, respectively.

FIG. 8 is a sectional view showing a charge distribution, a direction of a spontaneous polarization $P_S$ and a direction of a reverse electric field Vrev.

FIG. 9 is a schematic plan view illustrating changes in tilt angle $\theta$ during and after application of an electric field.

FIGS. 10 and 11 are graphs showing optical response characteristics according to a conventional device and the present invention, respectively.

DETAILED DESCRIPTION OF THE INVENTION

Figure 1:
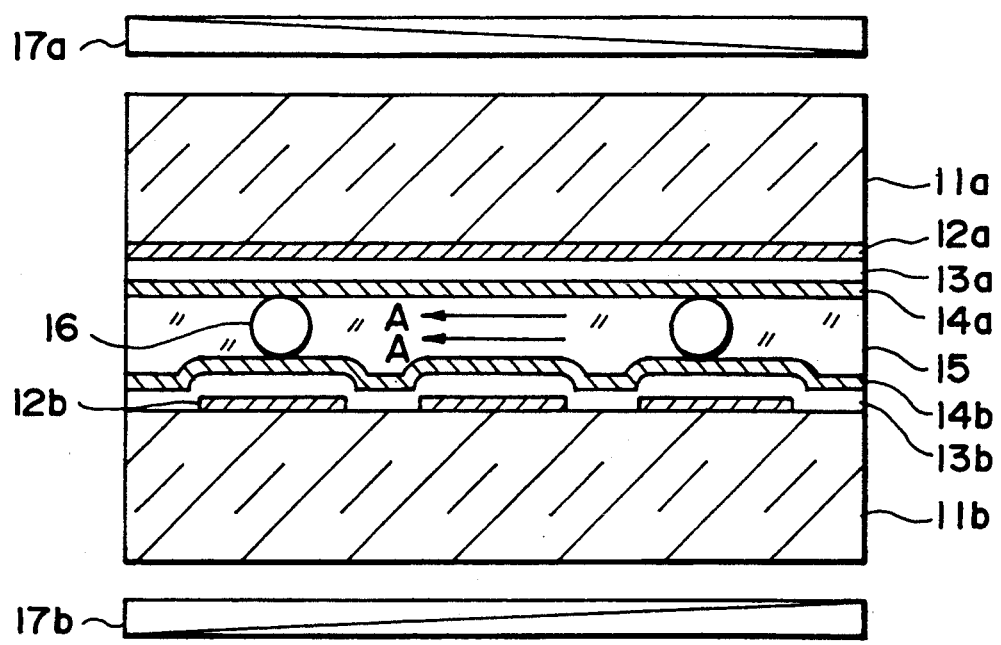
FIG. 1 is a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc., 200-1000 Å-thick insulating films 13a of $SiO_2$, $TiO_2$, $Ta_2O_5$, etc., and 50-1000 Å-thick alignment control films 14a and 14b.

In this instance, the alignment control films 14a and 14b have been treated by rubbing in directions which are parallel to each other and in the same direction (indicated by arrows A in FIG. 1). A chiral smectic liquid crystal 15 is disposed between the substrates 11a and 11b, and the spacing between the substrates 11a and 11b is set to provide the liquid crystal layer 15 with a thickness (e.g., 0.1-3 microns) which is sufficiently small to suppress the formation of a helical structure of the chiral smectic liquid crystal 15 by disposing spacer beads 16 of, e.g., silica, alumina, etc. between the substrates 11a and 11b, whereby the chiral smectic liquid crystal 15 assumes a bistable alignment state.

According to our experiments, by using an alignment method using a specific polyimide alignment film treated by rubbing as explained with reference to Examples described hereinafter, there has been realized an alignment state which provides a large optical contrast between a bright and a dark state, particularly with respect to non-selected pixels during multiplexing drive as disclosed in U.S. Pat. No. 4,655,561, etc., and also is free from a delay in optical response leading to a problem of after-image in a display at the time of switching during such multiplexing drive. Such a delay in optical response will be described in further detail hereinafter with reference to FIG. 10.

According to the present invention, at least one of the alignment films 14a and 14b is constituted by a polyimide (in a sense of including oligomers such as dimers and trimers) formed by dehydrocyclization of a polyamide acid (also in a sense of including oligomers such as dimers and trimers) which has been obtained by reacting at least one acid component selected from naphthalene-tetracarboxylic acid and/or derivatives thereof with a diamine component selected from diamines and/or derivatives thereof.

Examples of the naphthalenetetracarboxylic acid derivatives may include: 1,4,5,8-naphthalenetetracarboxylic acid dianhydride, 1,2,3,4-naphthalenetetracarboxylic acid dianhydride, 1,2,5,6-naphthalenetetracarboxylic acid dianhydride and 2,3,6,7-naphthalenetetracarboxylic acid dianhydride.

It is possible to use another acid component in addition to the naphthalenetetracarboxylic acid or derivative thereof for reaction with a diamine component. Such another acid component is not particularly limited but examples thereof may include: pyromellitic acid dianhydride, 3,3′,4,4′-tetracarboxybiphenyl dianhydride, 2,3,3′,4′-tetracarboxybiphenyl dianhydride, 3,3′,4,4′-tetracarboxybiphenyl ether dianhydride, 3,3′,4,4′-tetracarboxybenzophenone dianhydride, 2,3,3′,4′-tetracarboxybenzophenone dianhydride, 3,3′,4,4′-tetracarboxydiphenylmethane dianhydride, 2,2-bis(3,4-dicarboxyphenyl)propane dianhydride, 2,2-bis(3,4-dicarboxyphenyl)hexafluoropropane dianhydride, 3,3′,4,4′-tetracarboxydiphenylsulfone dianhydride, 2,2-bis[4-(3,4-dicarboxyphenoxy)phenyl]propane dianhydride, and 2,2-bis[4-(3,4-dicarboxyphenoxy)phenyl]-hexafluoropropane dianhydride.

Such another acid component should be not more than 99 wt. %, preferably not more than 90 wt. % of the total acid components.

The diamine component used in the present invention is not particularly limited, but one having at least one aromatic ring is preferred. Examples thereof may include those represented by the following formulae (1)-(4).

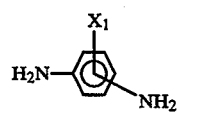
Formula (1)

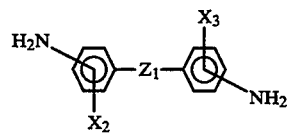
Formula (2)

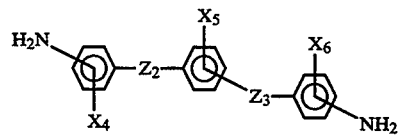
Formula (3)

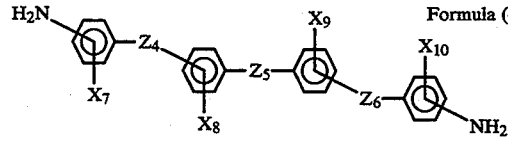
Formula (4)

In the above formulae (1)-(4), $Z_1$-$Z_6$ independently denote a single bond, —O—, —$CH_2$—, —S—, —$SO_2$—, —CO—, —$C(CH_3)_2$— or —$C(CF_3)_2$—; and $X_1$-$X_{10}$ independently denote H, F, $CH_3$ or $CF_3$.

Further, in the formula (1), the two amino groups are preferably at para- or meta-positions, and $X_1$ is preferably H.

In the formula (2), $Z_1$ is preferably a single bond, —S—, —$CH_2$—, —$C(CH_3)_2$— or —$C(CF_3)_2$—; $X_2$ and $X_3$ are preferably H, $CH_3$ or $CF_3$, more preferably H; and the two amino groups are preferably positioned at para-positions respectively with respect to the bonding group $Z_1$.

In the formula (3), $Z_2$ and $Z_3$ are preferably a single bond, —O—or S; $X_4$, $X_5$ and $X_6$ are preferably H, $CH_3$ or $CF_3$; $Z_2$ and $Z_3$ are preferably at para-positions with each other; and the two amino groups are preferably at para- or meta-positions with respect to the bonding groups $Z_2$ and $Z_3$, respectively.

In the formula (4), $Z_5$ is preferably —$C(CH_3)_2$—or —$C(CH_3)_2$—; $Z_4$ and $Z_6$ are preferably —O—, —S—or —$CH_2$—; $Z_8$ and $Z_9$ are preferably H; $X_7$ and $X_{10}$ are preferably H, F or $CF_3$; $Z_4$ and $Z_6$ are preferably at para-positions respectively with respect to $Z_5$; and the two amino groups are preferably at para- or metapositions with respect to the bonding groups $Z_4$ and $Z_6$, respectively.

Specific examples of the diamines represented by the formula (1) may include p-phenylenediamine and m-phenylenediamine.

Examples of the diamines represented by the formula (2) may include: 4,4′-diaminodiphenyl ether, 4,4′-diaminodiphenylmethane, 4,4′-diaminophenyl sulfone, 2,2-bis(p-aminophenyl)propane, 2,2-bis(p-aminophenyl)hexafluoropropane, 3,3′-diaminodiphenyl ether, 3,3′-diaminodiphenylmethane, 3,3′-diaminodiphenyl sulfone, 3,3′dimethyl-4,4′-diaminodiphenyl ether, 3,3′dimethyl-4,4′-diaminodiphenylmethane, 3,3′dimethyl-4,4′-diaminodiphenyl sulfone, 2,2-bis(m-aminophenyl)propane, 2,2-bis(m-aminophenyl)hexafluoropropane, and 3,3′-dimethylbenzidine.

Examples of the diamines represented by the formula (3) may include: 1,4″-diaminoterphenyl, 1,4-bis(p-aminophenoxy)benzene, 1,4-bis(m-aminophenoxy)benzene, 1,4-bis(4-amino-3-methylphenoxy)benzene and 1,4-bis(4-amino-3-trifluoromethylphenoxy)benzene.

Further, examples of the diamines represented by the formula (4) may include: 2,2-bis[(4-aminophenoxy)phenyl]propane, 2,2-bis[(4-amino-3-fluorophenoxy)phenyl]propane, 2,2-bis[(4-amino-3-methylphenoxy)phenyl]propane, 2,2-bis[(4-amino-3-trifluoromethylphenoxy)phenyl]propane, 2,2-bis[(4-aminophenoxy)phenyl]hexafluoropropane, 2,2-bis[(4-amino-3-methylphenoxy)phenyl]hexafluoropropane, 2,2-bis[(4-amino-3-trifluoromethylphenoxy)phenyl]hexafluoropropane, 2,2-bis[(4-amino-2-fluorophenoxy)phenyl]propane, 2,2-bis[(4-amino-2-methylphenoxy)phenyl]propane, 2,2-bis[(4-amino-2-trifluoromethylphenoxy)phenyl]propane, 2,2-bis[(4-amino-2-fluorophenoxy)phenyl]hexafluoropropane, 2,2-bis[(4-amino-2-methylphenoxy)phenyl]hexafluoropropane, 2,2-bis[(4-amino-2-trifluoromethylphenoxy)phenyl]hexafluoropropane, 2-[(4-amino-3-fluorophenoxy)phenyl]-2-[(4-aminophenoxy)phenyl]propane, 2-[(4-amino-3-trifluoromethylphenoxy)phenyl]-2-[(4-aminophenoxy)phenyl]propane, 2-[(4-amino-2-fluorophenoxy)phenyl]2-[(4-aminophenoxy)phenyl]propane, 2-[(4-amino-2-trifluoromethylphenoxy)phenyl]-2-[(4-aminophenoxy)phenyl]propane, 2-[(4-amino-2-methylphenoxy)phenyl]-2-[(4-aminophenoxy)phenyl]propane, 2-[(4-amino-3-fluorophenoxy)phenyl]-2-[(4-aminophenoxy)phenyl]hexafluoropropane, 2-[(4-amino-3-trifluoromethylphenoxy)phenyl-2-[(4-aminophenoxy)phenyl]hexafluoropropane, 2-[(4-amino-2-fluorophenoxy)phenyl]-2-[(4-aminophenoxy)phenyl]hexafluoropropane, 2-[(4-amino-2-trifluoromethylphenoxy)phenyl]-2-[(4-aminophenoxy)phenyl]hexafluoropropane, 2-[(4-amino-2-methylphenoxy)phenyl]-2-[(4-aminophenoxy)phenyl]hexafluoropropane, 2-[(4-amino-3-fluorophenoxy)phenyl]-2-[(4-amino-3-trifluoromethylphenoxy)phenyl]-propane, 2-[(4-amino-3-fluorophenoxy)-phenyl]-2-[(4-amino-2- trifluoromethylphenoxy)phenyl] propane, 2-[(4-amino-3-fluorophenoxy)phenyl]-2-[(4-amino-3-trifluoromethylphenoxy)phenyl]hexafluoropropane, 2[(4-amino-3-fluorophenoxy)phenyl]-2-[(4-amino-2-trifluoromethylphenoxy)phenyl]hexafluoropropane, 2,2-bis[(3-aminophenoxy)phenyl]propane, 2,2-bis[(3-aminophenoxy)phenyl]hexafluoropropane, 2,2-bis[(5-amino-2-fluorophenoxy)phenyl]propane, 2,2-bis[(5-amino-2-fluorophenoxy)phenyl]hexafluoropropane, 2-[(4-aminophenoxy)phenyl]-2-[(3-aminophenoxy)phenyl]propane, 2-[(4-aminophenoxy)phenyl]-2-[(3-aminophenoxy)phenyl]hexafluoropropane, 2-[(4-amino-3-trifluoromethylphenoxy)phenyl]-2-[(3-aminophenoxy)phenyl]propane, and 2-[(4-amino-2-fluorophenoxy)phenyl]-2-[(3-aminophenoxy)phenyl]hexafluoropropane.

A specific example of synthesis of one of the diamine components described above is described hereinbelow.

SYNTHESIS EXAMPLE 1

Production of 2,2-bis[4-(4-amino-3-trifluoromethylphenoxy)phenyl]hexafluoropropane.

(Step 1)

16.0 g (47.6 mmol) of 2,2-bis(4-hydroxyphenyl)hexafluoropropane, 26.9 g (119 mmol) of 5-chloro-2-nitrobenzotrifluoride and 20.2 g (190 mmol) of sodium carbonate were reacted at 150° C. for 4 hours in 100 ml of dimethylformamide. After the reaction, the product was injected into 250 ml of iced water and extracted with ethyl acetate. The organic layer was washed with water and dried on anhydrous sodium sulfate. After filtration, the solvent was distilled off to recover a crude product, which was then purified by silica gel column chromatography (eluent: toluene/hexane=1/1) and then treated by activated carbon to obtain 32.6 g (yield: 95.9%) of 2,2-bis[(4-(4-nitro-3-trifluoromethylphenoxy)phenyl]hexafluoropropane.

(Step 2)

31.7 g (44.4 mmol) of the dinitro compound obtained in the above step 1 was dissolved in 100 ml of ethanol and heated to 70° C. To the mixture, 1.93 g of activated carbon and 106 mg of ferric chloride were added, and the mixture was stirred for 30 min. under heating. Then, 9.16 g (133.2 mmol) of hydrazine monohydrate (purity 80%) was added dropwise thereto. After 4 hours of reaction, the mixture was filtrated in a hot state to remove the insoluble matter. The filtrate was condensed and injected into 200 ml of water, followed by extraction with ethyl acetate, washing with water and drying on anhydrous sodium sulfate. After filtration, the product was purified by silica gel column chromatography (eluent: toluene) to obtain 21.2 g (yield: 73.0%) of 2,2-bis[4-(4-amino-3-trifluoromethylphenoxy)phenyl]hexafluoropropane.

Then, an example of synthesis of a polyamide acid usable in the present invention is described below.

SYNTHESIS EXAMPLE 2

6.54 g (10 mmol) of the 2,2-bis[4-(4-amino-3-trifluoromethylphenoxy)phenyl]hexafluoropropane obtained in the above Synthesis Example 1 was accurately weighed into a reaction vessel and dried under a reduced pressure for 1.5 hours together with the reaction vessel in a drier at 150° C. Then, 30 ml of sufficiently dried N-methyl-2-pyrrolidone (NMP) was added thereto to dissolve the diamine. Then, 2.68 g (10 mmol) of 1,4,5,8-naphthalenetetracarboxylic acid dianhydride which had been dried under a reduced pressure for 1.5 hours in a drier at 150° C., was accurately weighed and added in several times into the reaction vessel. A portion of the acid dianhydride attached to the well of the vessel during the addition was washed with dry NMP as desired and the mixture was vigorously stirred for 5 hours at room temperature. Consequently, 80 ml of NMP was added in total.

In order to form a film 14a or 14b of the polyimide on a substrate, a solution of a polyamide acid as a precursor of the polyimide prepared as described above in a solvent, such as dimethylformamide, dimethylacetoamide, dimethylsulfoxide or N-methylpyrrolidone at a concentration of 0.01–40 wt. % may be applied onto the substrate by spinner coating, spray coating, roller coating, etc., and heated at 100°–350° C., preferably 200°–300° C., to cause dehydro-cyclization. The thus-formed polyimide film may be rubbed with a cloth, etc. The polyimide film may be formed in a thickness of, e.g., 30 Å-1 micron, preferably 200–2000 Å, so as to also function as an insulating film. In this case, the insulating films 13a and 13b can be omitted. Further, in case of forming the polyimide film on the insulating film 13a or 13b, the polyimide film thickness may be set to 200 Å or less, preferably 100 Å or less.

The liquid crystal material 15 used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 micron or longer in cholesteric phase (measured at a mid temperature in the cholesteric range). Preferred examples of such a liquid crystal material may include liquid crystal materials (1)–(5) below comprising the following liquid crystals "LC-1", "80B" and "80SI*" in the indicated proportions by weight.

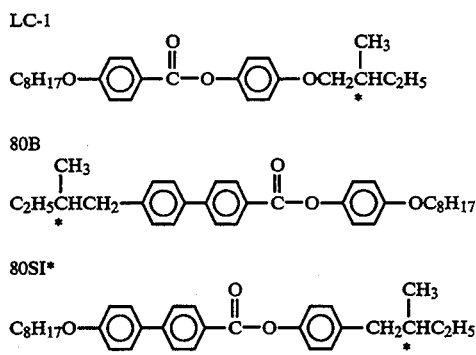

Figure 2:
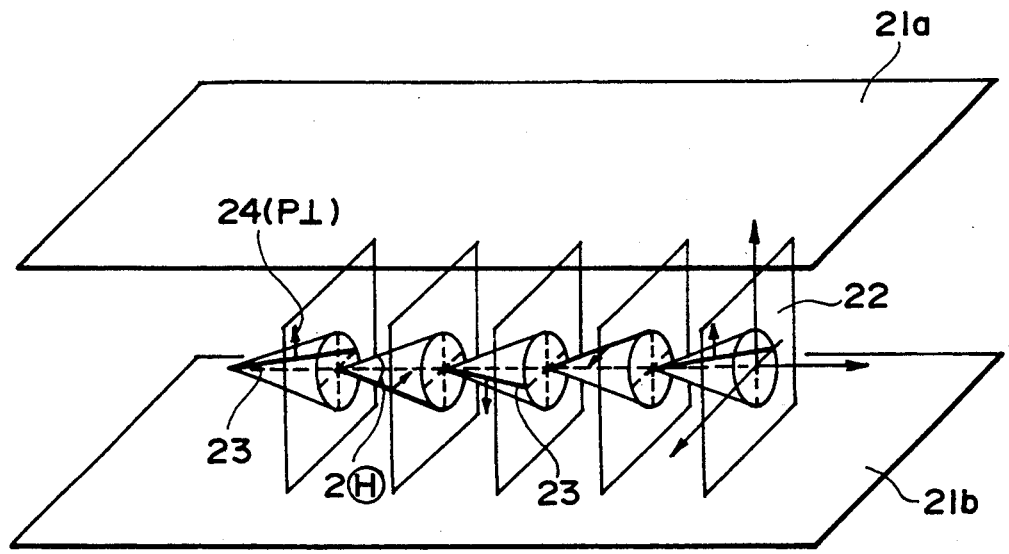
FIG. 2 is a perspective view showing schematically an alignment of a chiral smectic liquid crystal having a helical structure.

Liquid crystal material (1) (LC-1)$_{90}$/(80B)$_{10}$
(2) (LC-1)$_{80}$/(80B)$_{20}$
(3) (LC-1)$_{70}$(80B)$_{30}$
(4) (LC-1)$_{60}$/(80B)$_{40}$
(5) (80SI*)$_{100}$ FIG. 2 is a schematic illustration of a ferroelectric liquid crystal cell (device) for explaining operation thereof. Reference numerals 21a and 21b denote substrates (glass plates) on which a transparent electrode of, e.g., In$_2$O$_3$, SnO$_2$, ITO (indium-tin-oxide), etc., is disposed, respectively. A liquid crystal of an SmC*-phase (chiral smectic C phase) or SmH,-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
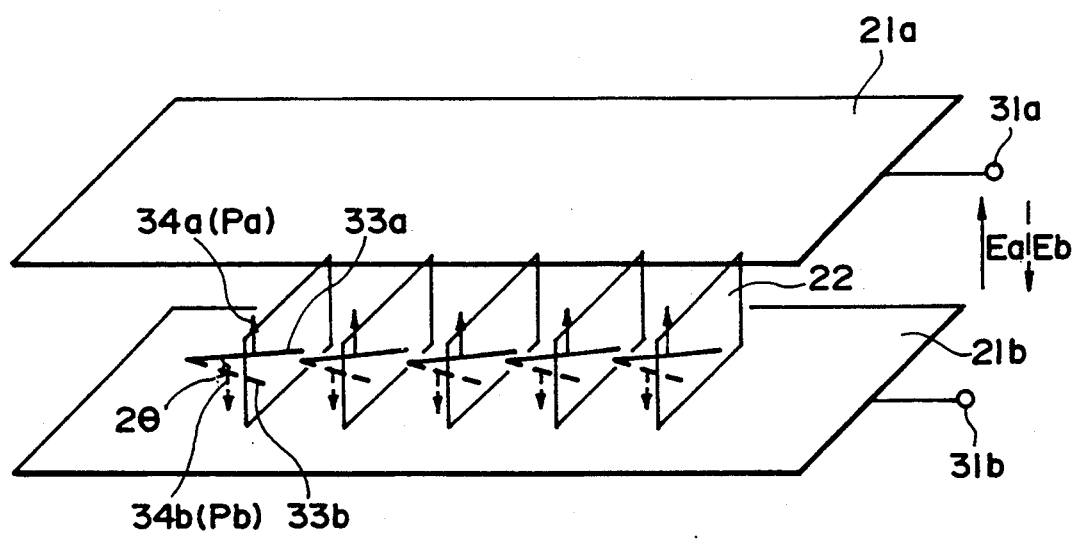
FIG. 3 is a perspective view showing schematically an alignment state of a chiral smectic liquid crystal having a non-helical structure.
Figure 4D:
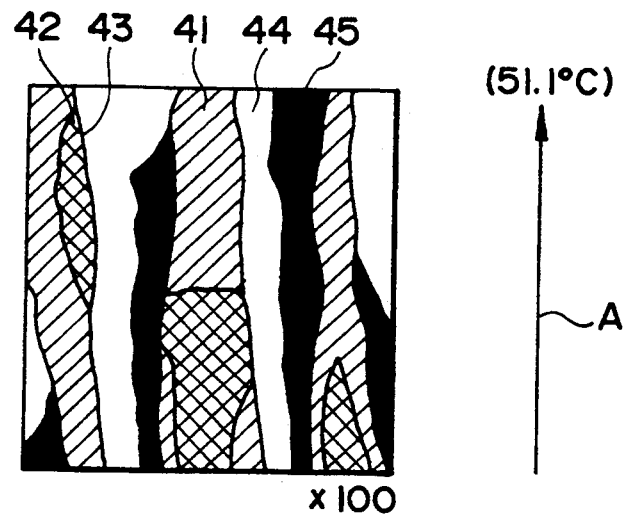
Figure 4E:
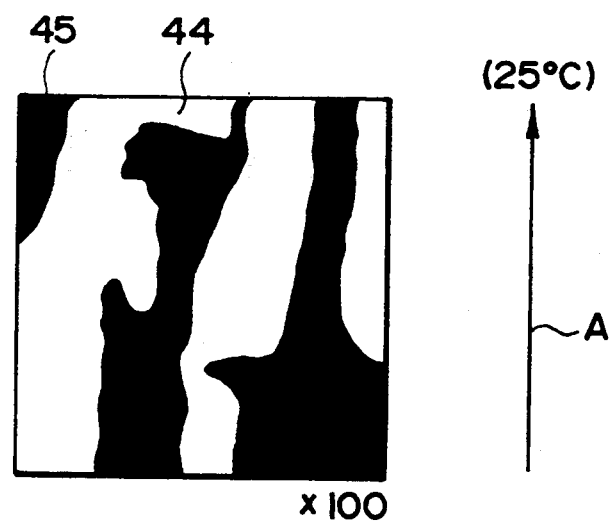
Figure 5:
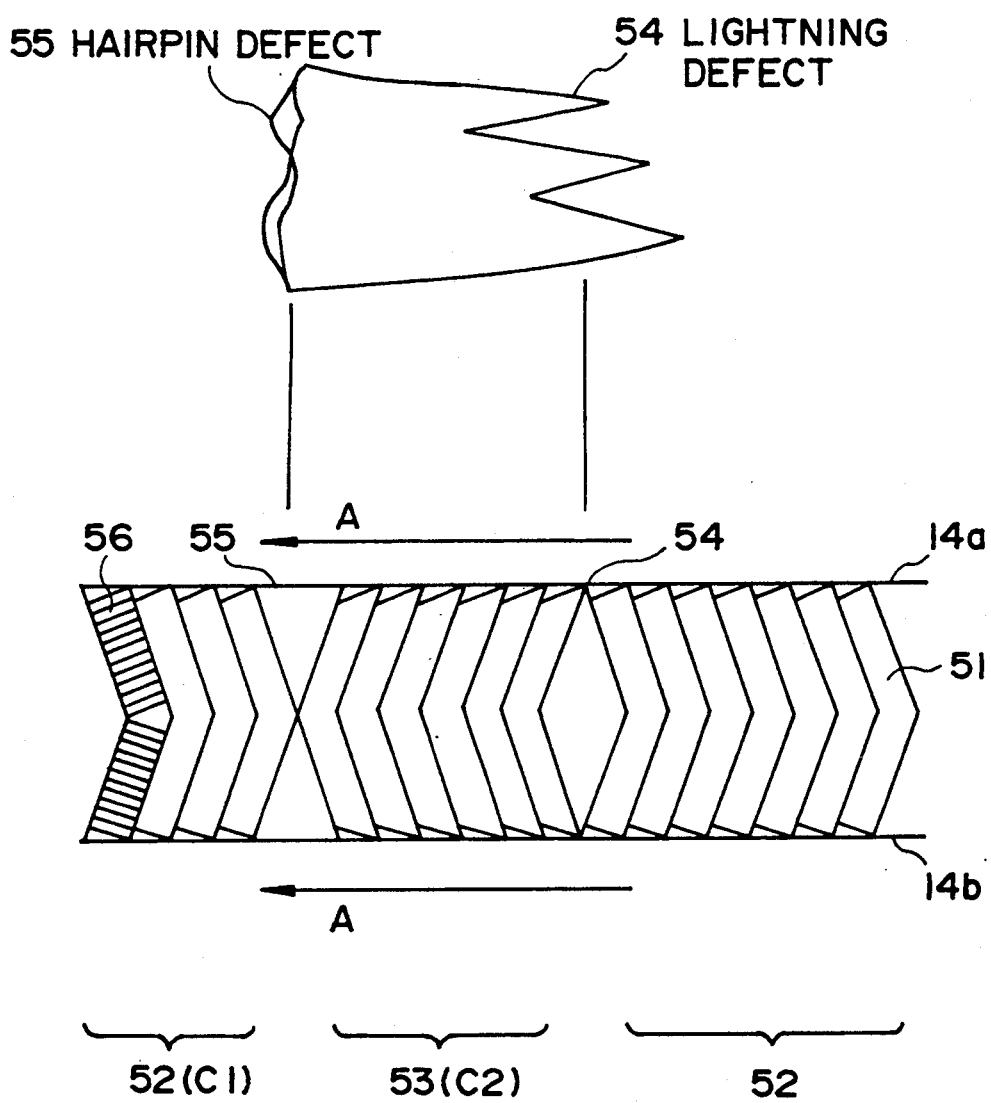
FIG. 5 is a schematic view for illustrating a difference between C1 and C2 alignment states.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 6A is a schematic sectional view showing an alignment state of liquid crystal molecules attained by the present invention, and FIG. 6B is a view showing alignment of corresponding C-directors.

Reference numerals 61a and 61b in FIG. 6A denote upper and lower substrates, respectively. Numeral 60 denotes a molecular layer composed of liquid crystal molecules 62, and liquid crystal molecules 62 are aligned so as to change their positions along the bottom face 64 (circular) of a cone 64. FIG. 6B more specifically shows a change in C-directors. Referring to FIG. 6B, at $U_1$ are shown C-directors 81 (each being a projection of a molecular long axis onto an imaginary plane perpendicular to the normal to a molecular layer 60) in one stable orientation state, and at $U_2$ are shown C-directors 81 in the other stable orientation state.

On the other hand, an alignment state attained by a conventional rubbing-treated polyimide film may be represented by a C-director diagram of FIG. 6C, which shows an alignment state wherein molecular axes are twisted in a large degree from the upper substrate 61a to the lower substrate 61b to provide a smaller tilt angle θ.

FIG. 7A is a schematic plan view illustrating a tilt angle θ in an alignment state where C-directors 81 assume a state shown in FIG. 6B (referred to as "uniform alignment state"), and FIG. 7B is a schematic plan view illustrating a tilt angle θ in an alignment state where C-directors 81 assume a state shown in FIG. 6C (referred to as "splay alignment state"). In these figures, reference numeral 70 denotes a rubbing axis provided to the above-mentioned fluorine-containing polyimide film, numeral 71a denotes an average molecular axis in the orientation state $U_1$, numeral 71b denotes an average molecular axis in the orientation state $U_2$, numeral 72a denotes an average molecular axis in the orientation state $S_1$, and numeral 72b denotes an average molecular axis in the orientation state $S_2$. The average molecular axes 71a and 71b can be switched to each other by applying voltages of mutually opposite polarities. Similar switching is caused between the average molecular axes 72a and 72b.

Next, the effectiveness of the uniform alignment state with respect to a delay in optical response (after-image) due to a reverse electric field Vrev is explained.

If the capacitance of an insulating layer constituting a liquid crystal cell is denoted by $C_i$, the capacitance of a liquid crystal layer is denoted by $C_{LC}$ and the spontaneous polarization of the liquid crystal is denoted by $P_S$, Vrev causing after-image is expressed by the following equation.

$$V_{rev} = 2P_S/(C_i + C_{LC})$$

FIG. 8 is a schematic sectional view illustrating changes in charge distribution direction of $P_S$ and direction of the reverse electric field in a liquid crystal cell. At FIG. 8(a), there is shown a distribution of ⊕ and ⊖ charges in a memory state before application of a pulse electric field, where the spontaneous polarization is directed from ⊕ charges to ⊖ charges. At FIG. 8(b) is shown a state immediately after removal of a pulse electric field, when the direction of the spontaneous polarization $P_S$ is opposite to that shown at FIG. 8(a) (thus, the liquid crystal molecules are inverted from one stable orientation state to the other orientation state) but the distribution of the ⊕ and ⊖ charges is similar to that shown at FIG. 8(a), so that a reverse electric field Vrev is generated as indicated by an arrow shown at FIG. 8(b). The reverse electric field Vrev disappears in a short time to provide a distribution of ⊕ and ⊖ charges as shown at FIG. 8(c).

FIG. 9 is a plan view showing a change in optical response in a splay alignment state given by a conventional polyimide alignment film in terms of a change in tilt angle θ. Referring to FIG. 9, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle $\widehat{H}$ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle $\theta$ due to the action of the reverse electric field Vrev shown at FIG. 8(b). Then, as the reverse electric field Vrev attenuates as shown at FIG. 8(c), the orientation is changed along a path denoted by an arrow $X_3$ to an average molecular axis S(C) in a splay alignment state providing a stable orientation state having a somewhat increased tilt angle $\theta$. The resultant optical response in this case is shown in FIG. 10.

In the alignment state given by using the polyimide film obtained by using a naphthalenetetracarboxylic acid of the present invention, the average molecular axes S(A), S(B) and S(C) in the splay alignment state shown in FIG. 9 are not caused but it is possible to form an alignment state with an average molecular axis giving a tilt angle $\theta$ which is close to a maximum tilt angle $\widehat{H}$. An optical response at this time according to the present invention is shown in FIG. 11. FIG. 11 shows that a delay in optical response causing after-image is obviated and a high contrast in memory states is caused.

Figure 12:
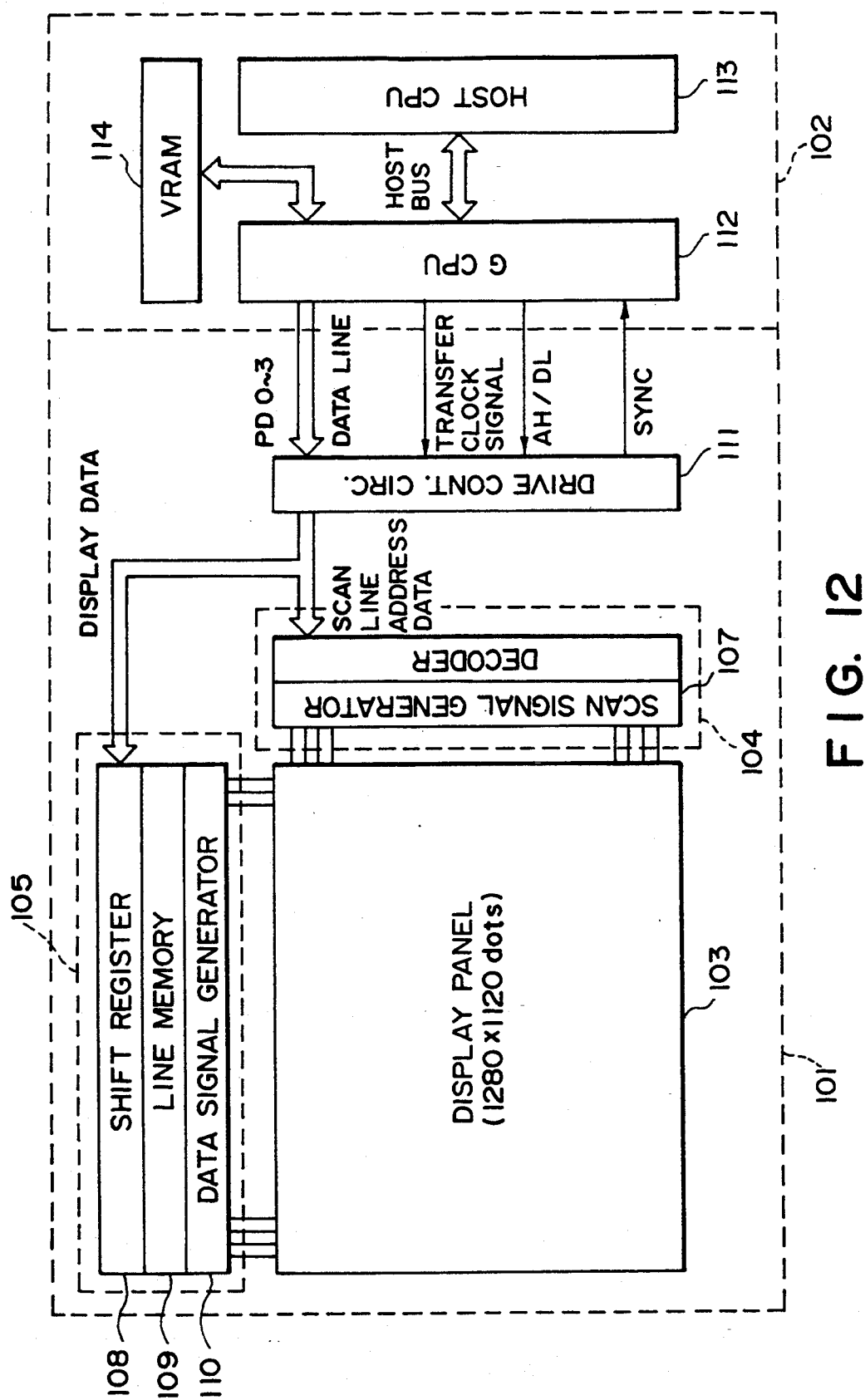
FIG. 12 is a block diagram of a liquid crystal display apparatus and a graphic controller.
Figure 13:
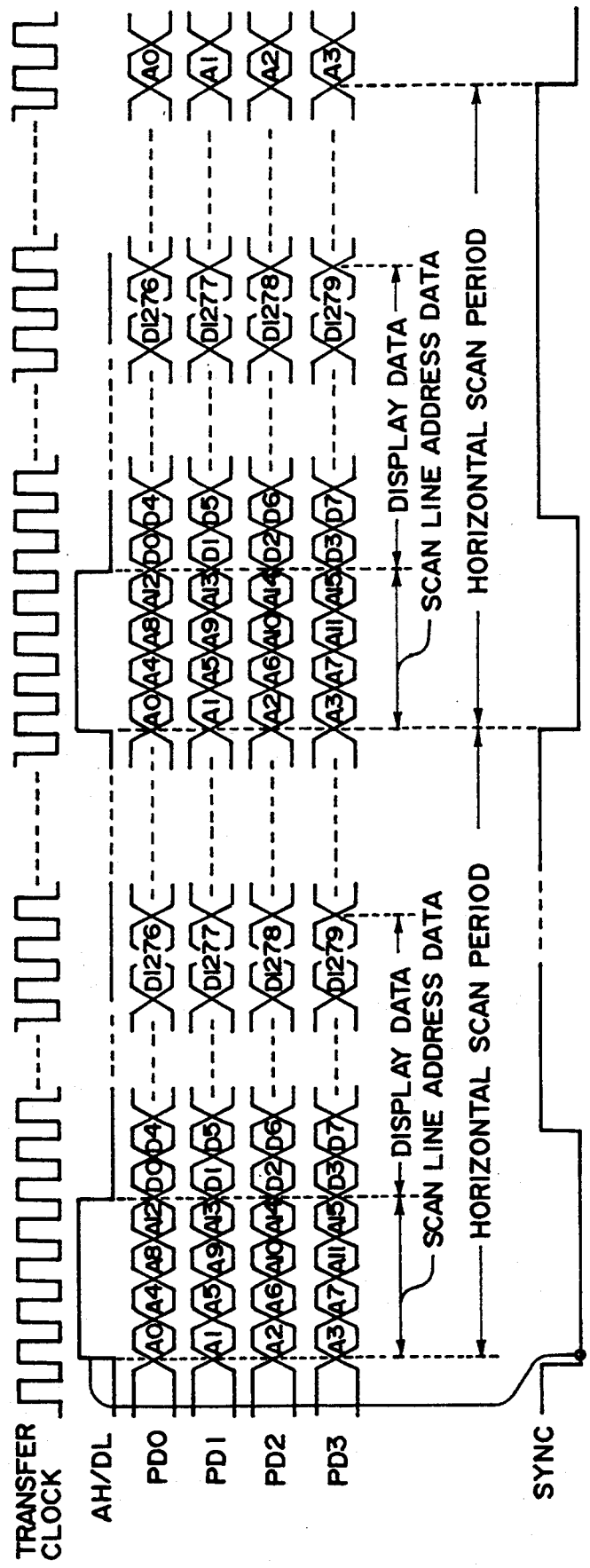
FIG. 13 is a time chart showing time correlation for image data communication between the liquid crystal display apparatus and the graphic controller.

A liquid crystal display apparatus may be constituted by using the liquid crystal device for a display panel and by adopting an arrangement and data format comprising image data accompanied with scanning line address data and also a communication synchronization scheme using a SYNC signal as shown in FIGS. 12 and 13.

Image data are generated in a graphic controller 102 in an apparatus body and transferred to the display panel 103 (illuminated with a backlight (not shown)) by signal transfer means shown in FIGS. 12 and 13. The graphic controller 102 principally comprises a CPU (or GCPU, central processing unit) 112 and a VRAM (video-RAM, image data storage memory) 114 and is in charge of management and communication of image data between a host CPU 113 and the liquid crystal display apparatus (FLCD) 101. The control of image display according to the present invention is principally accomplished by the graphic controller 102.

Incidentally, in the liquid crystal device according to the present invention, it is also possible to use a nematic liquid crystal in place of the above-mentioned chiral smectic liquid crystal.

Hereinbelow, the present invention will be explained based on Examples.

EXAMPLE 1

Two 1.1 mm-thick glass plates each provided with a 1000 Å-thick ITO film were respectively coated with a 3.0 wt. % solution of a polyamide acid represented by the formula shown below in a mixture solvent of N-methylpyrrolidone/n-butylcellosolve=5/1 by means of a spinner rotating at 3000 rpm.

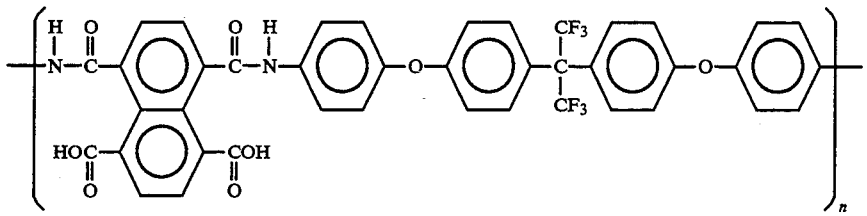

(n (degree of polymerization)=2–10) After the coating, the film was subjected to curing under heating at 250° C. for about an hour to form a 450 Å-thick film. The coating film was then rubbed in one direction with a nylon-planted cloth.

On one of the two glass plates thus treated, 1.5 microns alumina beads were dispersed, and the other glass plate was superposed thereon so that their rubbing axes were parallel to each other and disposed in the same direction to form a blank cell.

The blank cell was filled with a ferroelectric smectic liquid crystal ("CS-1014" (trade name), available from Chisso K.K.) under vacuum and, after sealing, was gradually cooled from isotropic phase at a rate of 5° C./hour to 30° C., whereby an alignment was effected. The "CS-1014" liquid crystal in the cell showed the following phase transition series.

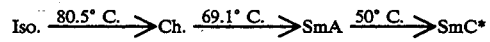

Iso.: isotropic phase,
Ch.: cholesteric phase,
SmA: smectic A phase,
SmC*: chiral smectic C phase.

The experiment thereafter was performed at 25° C.

The above-prepared liquid crystal cell was sandwiched between a pair of 90 degrees-cross nicol polarizers to provide a liquid crystal device and was supplied with a pulse of 50 psec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle $\theta=15$ degrees, transmittance in the brightest state=43%, transmittance in the darkest state=1%, contrast ratio=43:1.

The delay in optical response causing after-image was 0.2 sec or less.

Figure 14:
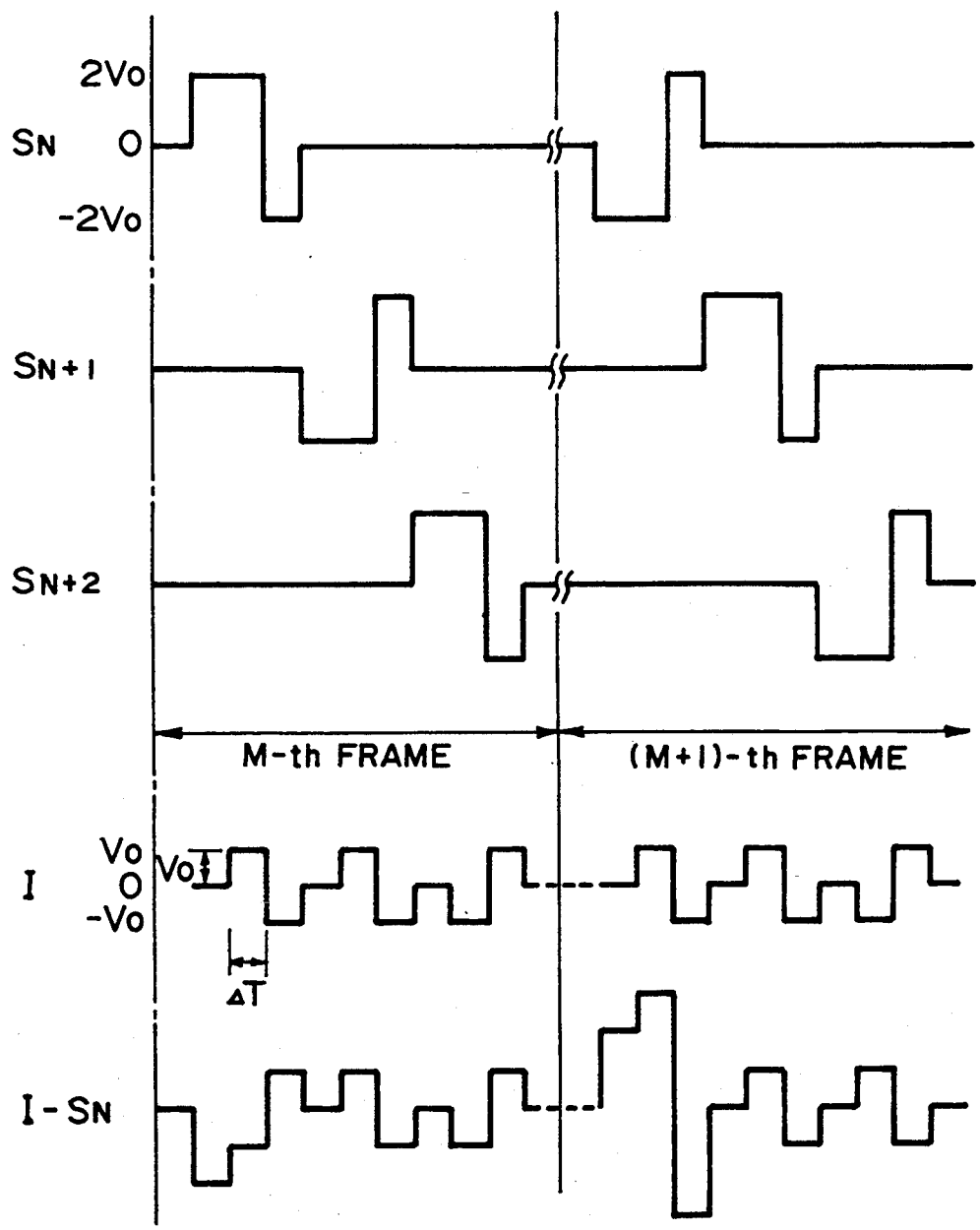
FIG. 14 is a waveform diagram illustrating driving waveforms used in an embodiment of the present invention.

The liquid crystal device was subjected to multiplexing drive for display using driving waveforms shown in FIG. 14, whereby a high-quality display with a high contrast was attained. Further, after an image display of a prescribed character image, the whole picture area was erased into "white", whereby no after-image was recognized. Referring to FIG. 14, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0 = 5$–$8$ volts and $\Delta T = 20$–$70$ μsec.

EXAMPLES 2–10 AND 13–17

Liquid crystal cells were prepared in the same manner as in Example 1 except that the alignment control films (in terms of precursor polyamide acids represented by the formulas wherein n and m respectively denotes a polymerization degree calculated based on measured data by GPC) and liquid crystal materials shown in Table 1 below were used.

The respective cells were tested in the same manner as in Example 1, whereby measured data of contrast ratio and delay time in optical response shown in Table 3 appearing hereinafter were obtained.

The respective cells were subjected to the multiplexing drive for display in the same manner as in Example 1, whereby similar results were attained with respect to contrast and after-image.

EXAMPLES 11 AND 12

In each example, two types of polyamide acids shown in Table 2 in the form of solution sin N-methylpyrrolidone were mixed with each other so that their solid weight ratio was as shown in Table 2. The resultant mixture solution was diluted with a solvent mixture of N-methylpyrrolidone and n-butyl cellosolve to a prescribed concentration. The thus obtained precursor polyamide acid mixture solution was used in combination with a liquid crystal material shown in Table 2 otherwise in the same manner as in Table 1.

The respective cells were tested in the same manner as in Example 1, whereby measured data of contrast ratio and delay time in optical response shown in Table 3 appearing hereinafter were obtained.

The respective cells were subjected to the multiplexing drive for display in the same manner as in Example 1, whereby similar results were attained with respect to contrast and after-image.

TABLE 2

| Example | Alignment film (precursor polyamide acid) | Liquid crystal material |
| --- | --- | --- |
| 2 | 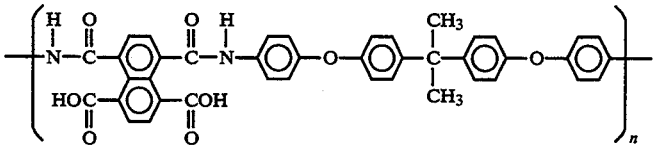 (n = 2–10) | "CS-1014" (trade name) (FLC, Chisso K.K.) |
| 3 | 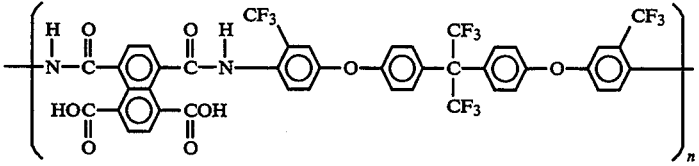 (n = 2–10) | "CS-1014" (trade name) (FLC, Chisso K.K.) |
| 4 | 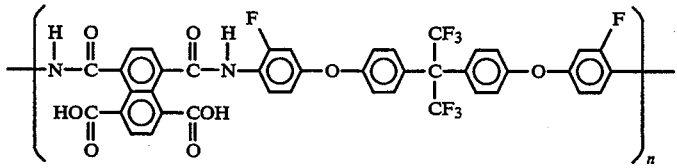 (n = 2–10) | "CS-1014" (trade name) (FLC, Chisso K.K.) |
| 5 | 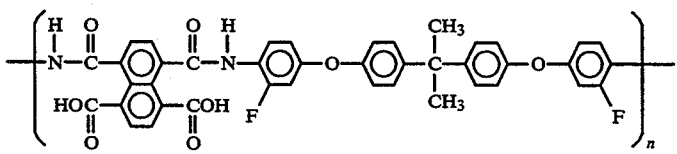 (n = 2–10) | "CS-1014" (trade name) (FLC, Chisso K.K.) |
| 6 | 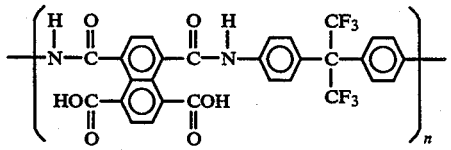 (n = 2–10) | "CS-1014" (trade name) (FLC, Chisso K.K.) |

TABLE 2-continued

| Example | Alignment film (precursor polyamide acid) | Liquid crystal material |
|---|---|---|
| 7 | 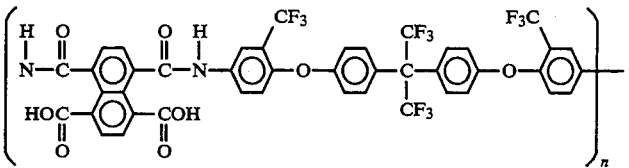 (n = 2-10) | Liquid crystal material (3) described hereinbefore |
| 8 | 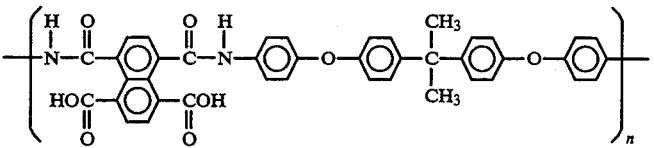 (n = 2-10) | Liquid crystal material (3) described hereinbefore |
| 9 | 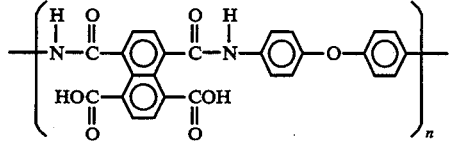 (n = 2-10) | Liquid crystal material (3) described hereinbefore |
| 10 | 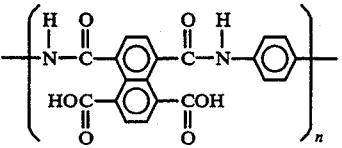 (n = 2-10) | Liquid crystal material (3) described hereinbefore |
| 11 | 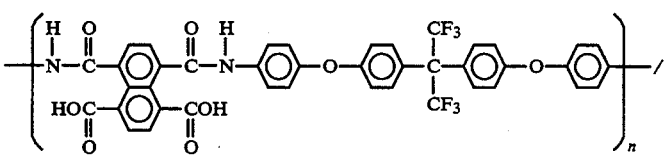 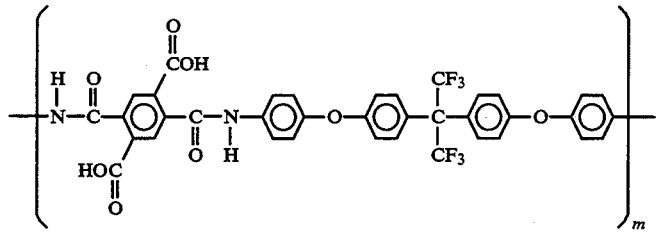 weight ratio = 50/50 (n = 2-10, m = 200-1000) | Liquid crystal material (3) described hereinbefore "CS-1014" (trade name) (FLC, Chisso K.K.) |
| 12 | 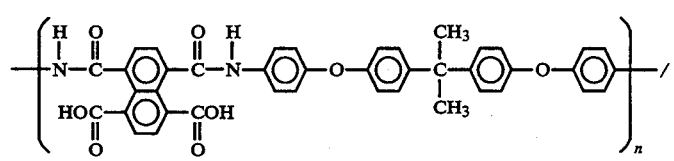 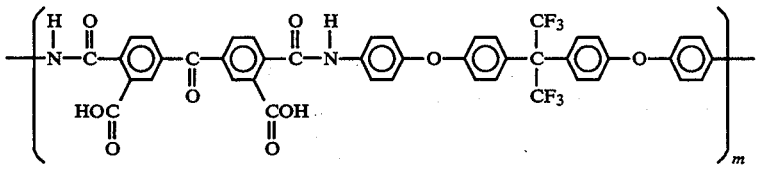 weight ratio = 75/25 (n = 2-10, m = 200-1000) | "CS-1014" (trade name) (FLC, Chisso K.K.) |

TABLE 2-continued

| Example | Alignment film (precursor polyamide acid) | Liquid crystal material |
|---|---|---|
| 13 | 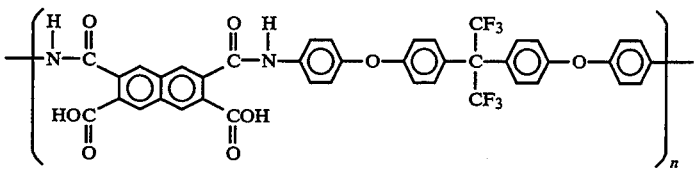 (n = 200–1000) | "CS-1014" (trade name) (FLC, Chisso K.K.) |
| 14 | 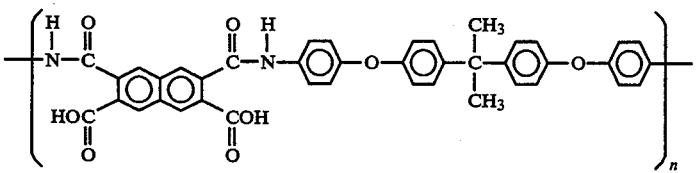 (n = 200–1000) | "CS-1014" (trade name) (FLC, Chisso K.K.) |
| 15 | 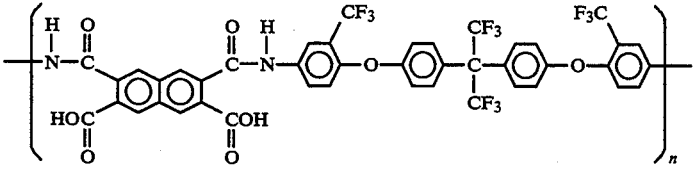 (n = 2–10) | "CS-1014" (trade name) (FLC, Chisso K.K.) |
| 16 | 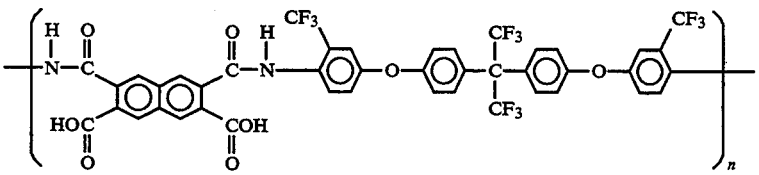 (n = 2–10) | "CS-1014" (trade name) (FLC, Chisso K.K.) |
| 17 | 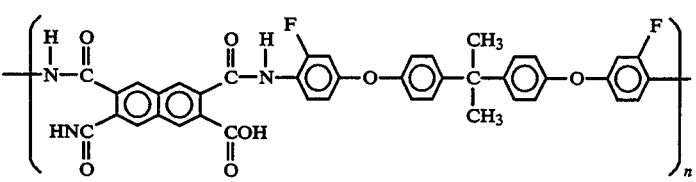 (n = 2–10) | "CS-1014" (trade name) (FLC, Chisso K.K.) |

TABLE 3

| Example | Contrast ratio | Delay in optical response (sec) |
|---|---|---|
| 2 | 37:1 | 0.2 |
| 3 | 32:1 | 0.3 |
| 4 | 46:1 | 0.2 |
| 5 | 41:1 | 0.3 |
| 6 | 31:1 | 0.3 |
| 7 | 33:1 | 0.1 |
| 8 | 39:1 | 0.1 |
| 9 | 35:1 | 0.2 |
| 10 | 32:1 | 0.1 |
| 11 | 45:1 | 0.1 |
| 12 | 38:1 | 0.1 |
| 13 | 40:1 | 0.2 |
| 14 | 37:1 | 0.1 |
| 15 | 36:1 | 0.2 |
| 16 | 30:1 | 0.3 |
| 17 | 33:1 | 0.2 |

COMPARATIVE EXAMPLES 1–4

Liquid crystal cells were prepared in the same manner as in Example 1 except that the alignment control films (in terms of commercially available precursor polyamide acid varnish and liquid crystal materials shown in Table 3 below were used. The measured data of contrast ratio and delay in optical response measured for each of the cells are shown in Table 5 below.

The respective cells were subjected to the multiplexing drive for display in the same manner as in Example 1, whereby the resultant contrasts were smaller than that given by Example 1 and after-image was recognized for each cell.

TABLE 4

| Comparative Example | Alignment film (polyamide acid varnish) | Liquid crystal material |
|---|---|---|
| 1 | "SP-710" (trade name) (aromatic polyimide | "CS-1014" (trade name) (FLC, Chisso K.K.) |

TABLE 4-continued

| Comparative Example | Alignment film (polyamide acid varnish) | Liquid crystal material |
|---|---|---|
| | varnish, Toray K.K.) | |
| 2 | "SP-710" (trade name) (aromatic polyimide varnish, Toray K.K.) | Liquid crystal material (3) described hereinbefore |
| 3 | "LQ-5200" (trade name) (polyimide varnish, Hitachi Kasei K.K.) | "CS-1014" |
| 4 | "LQ-5200" (trade name) (polyimide varnish, Hitachi Kasei K.K.) | Liquid crystal material (3) |

TABLE 5

| Comp. Example | Contrast ratio | Delay in optical response (sec) |
|---|---|---|
| 1 | 8:1 | 1.5 |
| 2 | 7:1 | 2.5 |
| 3 | 10:1 | 1.2 |
| 4 | 8:1 | 2.2 |

As is understood from the above Examples and Comparative Examples, in the liquid crystal device according to the present invention, a monodomain of a uniform and good alignment state is developed. As a result, the liquid crystal device provides a high-quality display which is characterized by a high contrast between the bright and dark states, particularly a very large contrast at the time of multiplexing drive and it free from unpleasant after-image.

What is claimed is:

1. A liquid crystal device, comprising:
a pair of substrates and a chiral smectic liquid crystal disposed between the substrates, at least one of said pair of substrates having thereon an alignment film comprising a polyimide having only side chains and substituents selected from the group consisting of F, $CH_3$ and $CF_3$ formed by dehydro-cyclization of a polyamide acid which is a reaction product of (i) a tetracarboxylic acid component selected from naphthalenetetracarboxylic acid and derivatives thereof with (ii) a diamine component selected from the group consisting of Formulae (1)–(4):

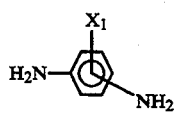

Formula (1)

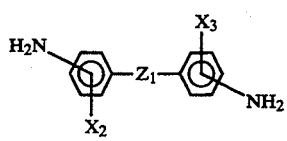

Formula (2)

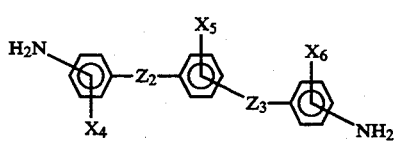

Formula (3)

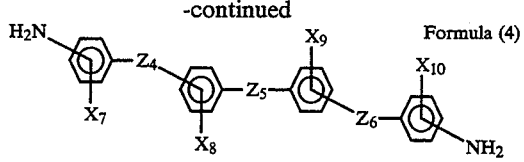

Formula (4)

wherein $Z_1$ denotes a single bond, $-CH_2-$, $-S-$, $-CO-$, $-C(CH_3)_2-$ or $-C(CF_3)_2-$; $Z_2-Z_6$ independently denote a single bond, $-O-$, $-CH_2-$, $-S-$, $-CO-$, $-C(CH_3)_2-$ or $-C(CF_3)_2-$; and $X_1-X_{10}$ independently denote H, F, $CH_3$ or $CF_3$ so as to form an alignment structure with a region of a C1 alignment state in which a plurality of smectic layers each comprising plural liquid crystal molecules are aligned parallel to each other, said plural liquid crystal molecules being aligned to extend such that their forward ends define acute pre-tilt angles with respect to said pair of substrates and the extension directions of said plural liquid crystal molecules adjacent to said pair of substrates intersect each other, and wherein said plurality of smectic layers are bent in a direction opposite to the forward direction of the molecules.

2. A device according to claim 1, wherein said tetracarboxylic acid component comprises 1,4,5,8-naphthalenetetracarboxylic acid dianhydride.

3. A device according to claim 1, wherein said tetracarboxylic acid component comprises 2,3,6,7-naphthalenetetracarboxylic acid dianhydride.

4. A device according to claim 1, wherein said liquid crystal is a chiral smectic liquid crystal.

5. A display apparatus, comprising:
(a) a liquid crystal device according to claim 1, in which each of said substrates has thereon an electrode;
(b) drive means for supplying signal voltages to the electrodes; and
(c) control means for controlling the drive means.

6. An apparatus according to claim 5, wherein said liquid crystal is a chiral smectic liquid crystal.

7. A device according to claim 1, wherein said diamine component is represented by the formula (1), wherein the two amino groups are independently at para or metapositions, and $X_1$ is H.

8. A device according to claim 1, wherein said diamine component is represented by the formula (2), wherein $Z_1$ is a single bond, $-S-$, $-CH_2-$, $-C(CH_3)_2$ or $-C(CF_3)_2$; $X_2$ and $X_3$ are H, $CH_3$ or $CF_3$, and the two amino groups are both at para-positions with respect to the bonding group $Z_1$.

9. A device according to claim 1, wherein said diamine component is represented by the formula (3), wherein $Z_2$ and $Z_3$ are a single bond, $-O-$ or $-S-$, $X_4$, $X_5$ and $X_6$ are H, $CH_3$ or $CF_3$; $Z_2$ and $Z_3$ are at para-positions with respect to each other; and the two amino groups are independently at para or meta-positions with respect to the bonding groups $Z_2$ and $Z_3$, respectively.

10. A device according to claim 1, wherein said diamine component is represented by the formula (4), wherein $Z_5$ is $-C(CH_3)_2$ or $-C(CF_3)_2$; $Z_4$ and $Z_6$ are $-O-$, $-S-$ or $CH_2$; $Z_8$ and $Z_9$ are H; $X_7$ and $X_{10}$ are H, F or $CF_3$; $Z_4$ and $Z_6$ are both at para- positions respectively with respect to $Z_5$; and the two amino groups are independently at para or meta-positions with respect to the bonding groups $Z_4$ and $Z_6$, respectively.

* * * * *

UNITED STATES PATENT AND TRADEMARK OFFICE
CERTIFICATE OF CORRECTION

PATENT NO. : 5,419,932

DATED : May 30, 1995

INVENTOR : TAKESHI TOGANO, ET AL

It is certified that errors appear in the above-identified patent and that said Letters Patent is hereby corrected as shown below:

COLUMN 1

Line 24, "of" (first occurrence) should read --or--.

COLUMN 2

Line 16, "tile" should read --tilt--; and

Line 62, "change" should read --chamges--.

COLUMN 3

Line 39, "caused" should read --be caused--; and

Line 62, "angle H" should read --angle (H)--.

COLUMN 4

Line 52, "microscope, hereinafter" should read --microscope (hereinafter--.

COLUMN 5

Line 27, "dehydrocyclization" should read --dehydro-cyclization--; and

Line 55, "FIG. 4A-4E" should read --FIGS. 4A-4E--.

UNITED STATES PATENT AND TRADEMARK OFFICE
CERTIFICATE OF CORRECTION

PATENT NO. : 5,419,932

DATED : May 30, 1995

INVENTOR : TAKESHI TOGANO, ET AL

It is certified that errors appear in the above-identified patent and that said Letters Patent is hereby corrected as shown below:

COLUMN 7

Line 58, "-C(CH$_3$)$_2$-or" should read -- -C(CH$_3$)$_2$- or--; and

Line 64, "-C(CH$_3$)$_2$-or" should read -- -C(CH$_3$)$_2$- or--.

COLUMN 8

Line 7, "-C(CH$_3$)$_2$-or" should read -- -C(CH$_3$)$_2$- or--; and

Line 8, "-S-or" should read -- -S- or--.

COLUMN 10

Line 66, SmH,-phase" should read --SmH*-phase--.

COLUMN 12

Line 1, "cone 64." should read --cone 63.--.

COLUMN 14

Line 44, "50 psec" should read --50 μsec--.

COLUMN 15

Line 9, "denotes" should read --denote--.

COLUMN 20

Line 54, "varnish" should read --varnish)--.

UNITED STATES PATENT AND TRADEMARK OFFICE
CERTIFICATE OF CORRECTION

PATENT NO. : 5,419,932

DATED : May 30, 1995

INVENTOR : TAKESHI TOGANO, ET AL

It is certified that errors appear in the above-identified patent and that said Letters Patent is hereby corrected as shown below:

COLUMN 21

Line 33, "it" should read --is--.

COLUMN 22

Line 11, "$-C(CH_3)_2-or$" should read -- $-C(CH_3)_2-$ or--;

Line 12, "and $X_1 - X_{10}$" should read --and $X_1 - X_{10}$--.

Line 13, "$CF_3$" should read --$CF_3,$--;

Line 45, "metapositions," should read --meta-positions--;

Line 54, "-S-," should read -- -S-;--; and

Line 64, "para- positions" should read --para-positions--.

Signed and Sealed this

Twenty-eighth Day of November 1995

Attest:

BRUCE LEHMAN

*Attesting Officer*  *Commissioner of Patents and Trademarks*